April 20, 1954 H. N. HANSEN 2,676,259

ELECTRIC OSCILLATOR

Filed Aug. 18, 1949 2 Sheets-Sheet 1

INVENTOR
HENDRIK NICOLAAS HANSEN
BY Fred M. Vogel
AGENT

April 20, 1954 H. N. HANSEN 2,676,259

ELECTRIC OSCILLATOR

Filed Aug. 18, 1949 2 Sheets-Sheet 2

INVENTOR
HENDRIK NICOLAAS HANSEN
BY Fred M. Vogel
AGENT

Patented Apr. 20, 1954 2,676,259

UNITED STATES PATENT OFFICE 2,676,259

ELECTRIC OSCILLATOR

Hendrik Nicolaas Hansen, Eindhoven, Netherlands, assignor to Hartford National Bank and Trust Company, Hartford, Conn., as trustee Application August 18, 1949, Serial No. 110,967

Claims priority, application Netherlands August 19, 1948

10 Claims. (Cl. 250—36)

This invention relates to circuit-arrangements for synchronizing an oscillator, more particularly a crystal-oscillator, by means of an alternating synchronization voltage in which arrangements the synchronization signal is supplied by way of a circuit comprising the crystal.

In circuit-arrangements of this type the amplitude of the oscillations produced by the oscillator increases as the frequency of the synchronization alternating voltage approaches the natural frequency of the oscillator. If the synchronization signal synchronizing a crystal oscillator is supplied by way of a circuit comprising the crystal, a further disadvantage is experienced. If the frequency of the synchronization signal is equal or substantially equal to the natural frequency of the crystal-oscillator, the alternating current traversing the crystal may be materially greater than in the case of free oscillation. The higher the Q factor of the crystal, the greater is this increase in current.

Due to this greater current the temperature of the crystal is liable to be increased. If the synchronization voltage is then switched off, the natural frequency of the oscillator is shifted owing to the increase in temperature and the normal frequency value is not restored until the crystal has cooled. This may take a comparatively long time, particularly in the case of crystals mounted in vacuo.

To this extent the frequency stability is adversely affected by the synchronization.

According to the invention the amplitude of the synchronization signal supplied to the oscillator is controlled in accordance with the difference between the natural frequency of the oscillator and the frequency of the alternating synchronization voltage, being greater as the frequency difference between the frequency of the synchronization voltage and the natural frequency of the oscillator is greater.

This control is preferably effected in such manner that in the case of equality of the said frequencies, no synchronization signal is fed to the oscillator.

Owing to such a control, the amplitude of the oscillations produced by the oscillator remains substantially constant throughout the synchronization range and, with the use of the said manner of synchronization of a crystal oscillator, the alternating current through this crystal is also substantially constant throughout the said range.

The synchronization range may be materially extended, since no abnormal temperature increase or cracking of the crystal need be feared.

In order that the invention may readily be carried into effect, two embodiments will now be described by way of example with reference to Figs. 1 and 2 of the accompanying drawings.

Figure 1:
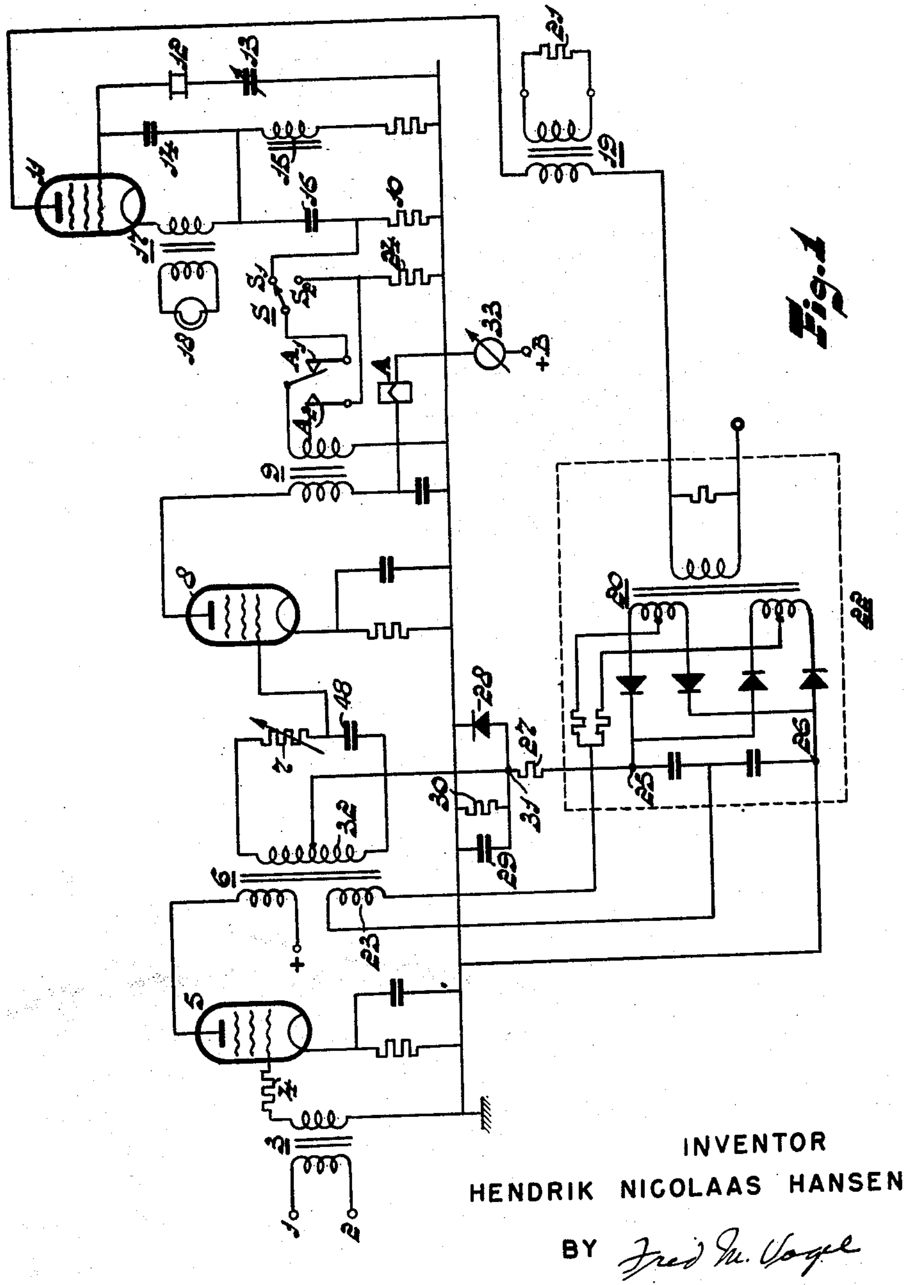

In the circuit-arrangement shown in Fig. 1 the alternating synchronization voltage is fed to the terminals 1 and 2 of the primary winding of a transformer 3. The secondary winding of this transformer is included, in series with a resistance 4, in the control-grid circuit of a tube 5. The output voltage of this tube is fed to the control-grid of the tube 8 through a phase-shifting network comprising the secondary winding 32 of a transformer 6, a variable resistance 7 and a condenser 48.

The ratio of transformer 3 and the adjustment of tube 5 are chosen, in a known manner, to be such that the output voltage of tube 5 is, within wide limits, substantially independent of the amplitude of the voltage at the terminals 1, 2, the resistance 4 in the control-grid circuit of tube 5 serving to limit any control-grid current.

The output voltage of tube 8 is fed to a resistance 10 by way of a transformer 9 and the series-connection of the contact $A_1$ of a change-over relay A and contact $S_1$ of a switch S.

This resistance 10 is included in the arrangement of a crystal oscillator comprising a tube 11 and a crystal 12. The crystal 12 is included, in series with the variable condenser 13, in the control-grid circuit of a tube 11, and in parallel with this series-connection is connected the series-connection of a condenser 14, a choke 15 and a resistance. The series-connection of choke 15 and the resistance constitute a D. C. circuit for the tube 11, since the cathode lead furthermore comprises a condenser 16. The cathode-lead of the tube comprises the primary winding of a transformer 17, a resistance lamp 18 being connected to the secondary winding, thus providing a stabilizing negative feed back.

The output circuit of the tube 11 comprises the series-connection of transformers 19 and 20. The oscillations produced by the oscillator are fed to the load 21 which is connected to the secondary winding of the transformer 19 and is represented diagrammatically by a resistance.

Part of the output voltage is fed by way of the transformer 20 to a phase-comparison device 22, the purpose of which will be set out more fully hereinafter.

The synchronization signal appearing by way of the resistance 10 is controlled by the series-connection of condenser 13, crystal 12 and condensers 14, 16 and filtered by crystal 12, the voltage set up by way of capacity 14 controlling the discharge tube 11.

With synchronized oscillators the phase difference between the synchronization voltage and the current in the output circuit of the oscillator varies with the difference between the natural frequency of the oscillator and the frequency of the synchronization signal.

This property is utilized for controlling the amplitude of the synchronization signal in accordance with the said frequency difference.

To this end the output signal of the oscillator is fed in phase-opposition by way of transformer 20 to the rectifiers of the phase-comparison device 22 which is constructed as a modulator circuit, a synchronization voltage which is fed in co-phase to the rectifiers of the modulator circuit, being taken from a third winding 23 of transformer 6.

If the oscillator oscillates freely, which is the case if contact $S_2$ of a switch S is closed, so that the synchronization signal is fed to a resistance 24, an alternating voltage of which the frequency is equal to the frequency difference between the synchronization voltage and the natural frequency of the oscillator is set up between the output terminals 25, 26 of the modulator arrangement.

However, upon synchronization of the oscillator, with contact $S_1$ closed, a direct voltage, the value and polarity of which depend upon the phase difference between the voltages fed to the modulator, is set up between the terminals 25, 26.

This voltage is fed by way of a resistance 27 to a rectifier 28, to which a condenser 29 and a resistance 30 are connected in parallel.

The rectifier 28 is arranged in such manner that the end 31 of resistance 27 can only assume a negative potential. This end is connected to the mid-tapping of the winding 32 of transformer 6. Consequently, the voltage produced across condenser 29 by way of resistance 7 is operative, as a negative control-voltage, at the control-grid of tube 8 and the amplification factor of this tube is controlled in accordance with the phase difference between the voltages fed to the modulator.

Rapid variations of the output voltage of the modulator circuit are smoothed with the use of condenser 29 and resistance 27.

The polarity and the value of the voltages fed to the modulator are chosen such that, if no phase difference occurs between these voltages, tube 8 does not amplify and amplification only starts at a phase difference of about 75° and attains its maximum at about 85°. The phase-shift of the network 7, 8 is adjusted so that, if the frequencies are equal and the control is cut out, i. e. in the case of interruption of resistance 27, the phase difference between the input voltages of the modulator is substantially zero. It is thus ensured that during synchronization the phase-shift is slightly less than 90°, so that the synchronization voltage is slightly greater than is necessary for synchronization.

Since the amplification of tube 8 is controlled in accordance with the frequency difference between the natural frequency of the oscillator and the frequency of the synchronization voltage, the anode current of the tube varies with this frequency difference.

The direct anode current of tube 8 traverses the series-connection of the energizing circuit of relay A and the milliammeter 33. After calibration of the milliammeter, the frequency-difference can be read directly from it.

The relay A is adapted to be adjusted so as to be energized at a definite current strength, whereon contact $A_1$ is opened and contact $A_2$ is closed, the resistance 24 being connected in the output circuit of tube 8 and the synchronization of the oscillator being at the same time interrupted.

Relay A may be provided with further contacts by means of which an alarm circuit and, for example, the change-over apparatus for a further oscillator are operated.

Relay A operates with a time-lag, which may be effected in known manner by thermal, electrical or mechanical agency. Consequently, any short interruption does not operate the alarm. A further advantage is also ensured. When the synchronization is interrupted at an excessive frequency difference, the modulator supplies an alternating voltage, the frequency of which is equal to this frequency difference, so that even the anode current of tube 8 fluctuates in this rhythm. As a result the relay A would be continually energized and de-energized. If the time-lag of relay A is sufficiently great, contact $A_2$ remains closed, as long as the frequency difference is great and contact $A_1$ is not closed again until the frequency difference drops to within the synchronization range.

Figure 2:
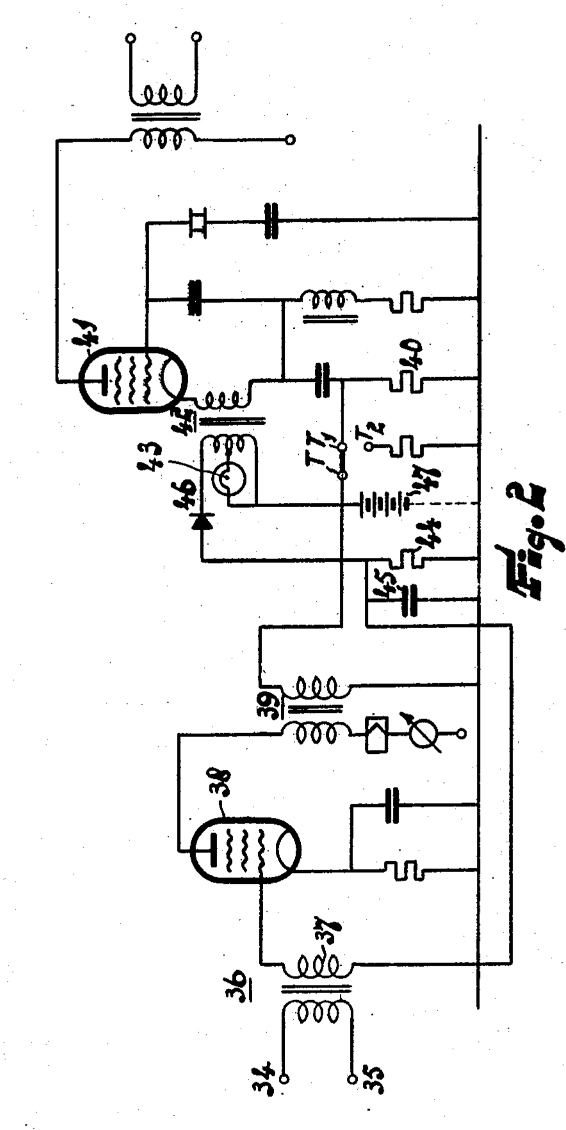

In the circuit-arrangement shown in Fig. 2 the control of the amplitude of the synchronization signal is ensured in a different manner. In this example use is made of the fact that the amplitude of the alternating currents and alternating voltages appearing in the oscillator depends upon the frequency difference between the natural frequency of the oscillator and the frequency of the synchronization signal supplied.

In the circuit-arrangement shown in Fig. 2 the alternating synchronization voltage is supplied by way of terminals 34, 35, to the primary winding of the transformer 36, the secondary winding 37 of which is included in the control-grid circuit of the tube 38. From the output circuit of tube 38 is taken, by way of a transformer 39 and a switch T, the synchronization voltage for the crystal oscillator, which voltage appears across the resistance 40.

The arrangement of the crystal oscillator is essentially the same as that shown in Fig. 1. It differs only in that the cathode-lead of tube 41 comprises a transformer 42, part of the secondary winding having connected to it a resistance lamp 43. The voltage set up throughout the winding is fed to a rectifying circuit comprising a resistance 44, a condenser 45 and a rectifier 46.

The direct voltage occurring across condenser 45 is fed, in series with the direct voltage of opposite polarity from a battery 47 which voltage serves as a threshold voltage, to the control-grid of tube 38 in negative polarity.

The resistance lamp 43 primarily has a stabilizing function, owing to the negative feed-back produced and furthermore, the alternating voltage appearing across the lamp is stepped up and rectified.

The value of the rectified voltage depends upon the said frequency difference. The threshold voltage from battery 47 prevents negative voltage from being supplied to the control-grid of tube 38 if the amplitude of the oscillations produced is normal.

What I claim is:

1. An oscillator system comprising an oscillator including an electron discharge tube and a resonator element coupled to said tube to determine the natural frequency of said oscillator, a source of alternating synchronization voltage, a variable gain device, means coupled to said source to supply said synchronization voltage through said device to said tube to control the operating frequency of said oscillator, means coupled to both said source and said oscillator and responsive to the difference between said synchronization voltage and the oscillations yielded by said oscillator to derive therefrom a control voltage dependent on said difference, and means to supply said control voltage to said device to vary the gain thereof in a direction at which the amplitude of said synchronization voltage increases with an increase in said difference to effect synchronization of said oscillator by said synchronization voltage.

2. An oscillator discharge system as set forth in claim 1 wherein said resonator element is a crystal.

3. An oscillator system comprising an oscillator including an electron discharge tube and a resonator element coupled to said tube to determine the natural frequency of said oscillator, a source of alternating synchronization voltage, a variable gain device, means coupled to said source to supply said synchronization voltage through said variable gain device to said tube to control the operating frequency of said oscillator, means coupled to both said source and said oscillator and responsive to the frequency and phase difference between said synchronization voltage and the oscillations yielded by said oscillator to derive therefrom a control voltage dependent on said frequency and phase difference, and means to supply said control voltage to said variable gain device to vary the gain thereof in a direction at which the amplitude of said synchronization voltage increases with an increase in said frequency and phase difference to effect synchronization of said oscillator by said synchronization voltage, said amplitude being substantially zero when the frequencies of said synchronization voltage and said oscillations are equal.

4. An oscillator system, as set forth in claim 3, wherein said variable gain device includes an additional electron discharge tube.

5. An oscillator system, as set forth in claim 4, wherein said means to derive said control voltage include a phase comparison device.

6. An oscillator system, as set forth in claim 5, wherein said means to supply said control voltage to said variable gain device includes a phase shifting network having a variable phase shift.

7. An oscillator system comprising an oscillator including an electron discharge tube and a resonator element coupled to said tube to determine the natural frequency of said oscillator, a source of alternating synchronization voltage, a variable gain device, means coupled to said source to supply said synchronization voltage through said device to said tube to control the operating frequency of said oscillator, means coupled to both said source and said oscillator and responsive to the difference between said synchronization voltage and the oscillations yielded by said oscillator to derive therefrom a control voltage dependent on said difference, means to supply said control voltage to said device to vary the gain thereof in a direction at which the amplitude of said synchronization voltage increases with an increase in said difference to effect synchronization of said oscillator by said synchronization voltage, and means coupled between said device and said means to derive a control voltage to prevent said synchronization voltage from being supplied to said tube when the frequency difference between said synchronization voltage and said oscillations exceeds a predetermined value.

8. An oscillator system, as set forth in claim 7, wherein said prevention means includes a relay having a selected time delay.

9. An oscillator system comprising an oscillator including an electron discharge tube and a resonator element coupled to said tube to determine the natural frequency of said oscillator, a source of alternating synchronization voltage, a variable gain device, means coupled to said source to supply said synchronization voltage through said device to said tube to control the operating frequency of said oscillator, means coupled to both said source and said oscillator and responsive to the phase and frequency difference between said synchronization voltage and the oscillations yielded by said oscillator to derive therefrom a control voltage dependent on said phase and frequency difference, said control voltage being a direct voltage when said difference is a phase difference and being an alternating voltage when said difference is a frequency difference, and means to supply said control voltage to said device to vary the gain thereof in a direction at which the amplitude of said synchronization voltage increases with an increase in said frequency difference to effect synchronization of said oscillator by said synchronization voltage.

10. An oscillator system comprising an oscillator including an electron discharge tube and a resonator element coupled to said tube to determine the natural frequency of said oscillator, a source of alternating synchronization voltage, a variable gain amplifier, means coupled to said source to supply said synchronization voltage through said device to said tube to control the operating frequency of said oscillator, means including a rectifier coupled to both said source and said oscillator and responsive to the frequency difference between said synchronization voltage and the oscillations yielded by said oscillator to derive therefrom a direct control voltage dependent on said frequency difference, and means to supply said control voltage to said amplifier to vary the gain thereof in a direction at which the amplitude of said synchronization voltage increases with an increase in said frequency difference to effect synchronization of said oscillator by said synchronization voltage.

References Cited in the file of this patent

UNITED STATES PATENTS

| Number | Name | Date |
| --- | --- | --- |
| 2,342,169 | Royden | Feb. 22, 1944 |
| 2,460,112 | Wright et al. | Jan. 25, 1949 |
| 2,466,782 | Robin | Apr. 12, 1949 |